(12) United States Patent
McCarthy et al.

(10) Patent No.: US 11,118,956 B2
(45) Date of Patent: Sep. 14, 2021

(54) FEEDLOT BUNK CALLING SYSTEM AND METHOD

(71) Applicant: Meat & Livestock Australia Limited, North Sydney (AU)

(72) Inventors: Stuart McCarthy, North Sydney (AU); Daniel McLeod, North Sydney (AU)

(73) Assignee: Meat & Livestock Australia Limited, North Sydney (AU)

( * ) Notice: Subject to any disclaimer, the term of this patent is extended or adjusted under 35 U.S.C. 154(b) by 297 days.

(21) Appl. No.: 16/163,239

(22) Filed: Oct. 17, 2018

(65) Prior Publication Data

US 2019/0368910 A1 Dec. 5, 2019

(30) Foreign Application Priority Data

Jun. 4, 2018 (AU) .................................. 2018203945

(51) Int. Cl.
*G01F 22/00* (2006.01)
*G01S 19/43* (2010.01)
*A01K 5/02* (2006.01)
*A01K 5/01* (2006.01)
*G01S 17/08* (2006.01)

(52) U.S. Cl.
CPC ............... *G01F 22/00* (2013.01); *A01K 5/01* (2013.01); *A01K 5/0275* (2013.01); *G01S 17/08* (2013.01); *G01S 19/43* (2013.01)

(58) Field of Classification Search
CPC ......... G01F 22/00; A01K 5/01; A01K 5/0275; G01S 17/08
USPC ........................................................ 702/156
See application file for complete search history.

(56) References Cited

U.S. PATENT DOCUMENTS

| | | | | | |
|---|---|---|---|---|---|
| 5,424,957 | A | * | 6/1995 | Kerkhoff | ................. A01K 5/02 700/240 |
| 6,032,084 | A | * | 2/2000 | Anderson | .............. A01K 29/00 700/241 |
| 7,650,215 | B2 | * | 1/2010 | Lu | ....................... B60G 17/019 701/70 |

(Continued)

FOREIGN PATENT DOCUMENTS

CN 206866318 U * 1/2018

OTHER PUBLICATIONS

•"Ag-tech: Automated bunk scanning a step closer for feedlots." Beef Central, Nascon Media Pty. Ltd, Published Mar. 6, 2018, Accessed Oct. 26, 2020, (Year: 2018).*

(Continued)

*Primary Examiner* — Catherine T. Rastovski
*Assistant Examiner* — Aeysha N Sultana
(74) *Attorney, Agent, or Firm* — Sterne, Kessler, Goldstein & Fox P.L.L.C.

(57) ABSTRACT

Aspects of the present invention include a feedlot bunk calling system comprising a mobile sensor arrangement comprising a ranging sensor unit, for generating a range signal indicative of a distance between the ranging sensor unit and a surface of feed within a feedlot bunk, and a positioning sensor unit, for generating a position signal indicative of a geospatial position of the mobile sensor arrangement. The system further comprises a computing module configured to generate an estimate or indication of an amount of feed in the feedlot bunk, based at least in part on the range signal and the position signal.

24 Claims, 6 Drawing Sheets

(56) References Cited

U.S. PATENT DOCUMENTS

| | | | |
|---|---|---|---|
| 8,958,980 B2* | 2/2015 | Miksa | G01S 17/89 |
| | | | 701/409 |
| 2007/0044581 A1* | 3/2007 | Wilcox | B64F 5/60 |
| | | | 73/865.9 |
| 2015/0034014 A1* | 2/2015 | Van Kuilenburg | A01K 5/02 |
| | | | 119/51.01 |
| 2017/0086429 A1* | 3/2017 | Horton | G01K 13/02 |
| 2017/0172075 A1* | 6/2017 | Bermudez Rodriguez | |
| | | | G05D 1/0278 |

OTHER PUBLICATIONS

Prototype development for sensor technologies to automate feedlot bunk management Meat and live stock Australia Ltd, Mar. 1, 2018 Accessed Oct. 26, 2020 (Year: 2018).*

* cited by examiner

FEEDLOT BUNK CALLING SYSTEM AND METHOD

CROSS-REFERENCE TO RELATED APPLICATIONS

This application claims priority to Australian Patent Application No. 2018203945, filed Jun. 4, 2018, which is incorporated herein in its entirety by reference thereto.

FIELD OF THE INVENTION

This invention generally relates to the field of feedlot bunk calling. Certain embodiments relate to a feedlot bunk calling system and a feedlot bunk calling method.

BACKGROUND OF THE INVENTION

Commercial feedlots are used to feed significant numbers of head of cattle or other livestock at various stages of growth. Using an animal feedlot to feed livestock may expedite the growth process, thus providing the ability to bring the livestock to market in a shorter time period compared with free range grazing livestock.

Feedlot bunk management includes determining feed allocation for feedlot livestock, e.g. determining the amount of feed required for a feeding cycle. Objectives of bunk management may include consistently maximising feed intake, whilst minimising feed wastage and digestive disorders, such as bloat and acidosis. Bunk calling is the process of determining a measure or indication of the amount of feed remaining in a feedlot bunk and is an important aspect of feedlot bunk management, as it can directly determine feed intake and carcase weight gain of penned feedlot livestock.

Bunk calling is commonly carried out manually, with a caller visiting a feedlot bunk to visually assess the amount of feed remaining in the feedlot bunk. Such manual feedlot bunk calling can be time consuming, and the accuracy and precision of the estimated amount of remaining feed based on a purely visual assessment can vary depending on the amount of experience and judgment of the caller.

In light of these and other limitations and trade-offs involved in known feedlot bunk calling methods, there is a need for alternative forms of feedlot bunk calling for use by the feedlot industry. One alternative is to utilise a computer system to assist with management of feedlot bunk calling. The computer system may seek to optimise time and energy required to carry out feedlot operations, for example by utilising satellite-based location determination of vehicles involved with feedlot management. There is a need for further technology solutions useful for feedlot bunk calling.

SUMMARY OF THE DISCLOSURE

In some embodiments, a feedlot bunk calling system includes: a mobile sensor arrangement comprising a ranging sensor unit, for generating a range signal indicative of a distance between the ranging sensor unit and a surface of feed within a feedlot bunk, and a positioning sensor unit, for generating a position signal indicative of a geospatial position of the mobile sensor arrangement; and a computing module configured to generate an estimate or indication of an amount of feed in the feedlot bunk, based at least in part on the range signal and the position signal.

The computing module may be configured to identify bounds of the feedlot bunk based at least in part on the position signal and a known geospatial position of at least part of the feedlot bunk.

The computing module may be configured to identify bounds of the feedlot bunk based at least in part on the range signal and a known cross-section of the feedlot bunk.

The ranging sensor unit may include a near-field laser (LiDAR) scanner.

The positioning sensor unit may include a Global Navigation Satellite System (GNSS) receiver.

The mobile sensor arrangement may further include an inertial measurement unit for generating an inertia correction signal indicative of the pitch, yaw and/or roll of the mobile sensor arrangement, and the computing module is configured to generate the estimate or indication of the amount of feed in the feedlot bunk based at least in part on the range signal, the position signal and the inertia correction signal.

The system may further include a georeferenced base station for generating a real time kinematic (RTK) or satellite based augmentation system (SBAS) correction signal, and the computing module may be configured to generate the estimate or indication of the amount of feed in the feedlot bunk based at least in part on the range signal, the position signal and the correction signal. The system may further include a rover and the computing module may include an onboard processor, wherein the mobile sensor arrangement and the onboard processor are provided on the rover. The onboard processor may be in wired communication with the mobile sensor arrangement.

The computing module may further include a user interface and be configured to present a real time graphical representation on the user interface of at least one of the signals generated by the mobile sensor arrangement. The computing module may be configured to present a real time graphical representation on the user interface of mobile mapping system (MMS) data in the form of a plurality of georeferenced, elevational cross-sections, each cross-section derived from a range signal scan and georeferenced by a time stamp correlated position signal. The computing module may be configured to present a real time graphical representation on the user interface of MMS data in the form of a plurality of a 3D spatial data.

The mobile sensor arrangement may be mounted on an unmanned aerial vehicle (UAV).

The mobile sensor arrangement may be mounted on an unmanned or manned ground vehicle.

The ranging sensor unit may be mounted on a substantially horizontal cantilevered boom that can be configured to extend in a transverse direction substantially perpendicular to a direction of travel of the mobile sensor arrangement. A length of lateral extension and/or an orientation angle of the boom may be adjustable.

The ranging sensor unit may be mounted on the boom via a gimbal connection, to allow manual rotational adjustments to the ranging sensor unit.

In some embodiments, a feedlot bunk calling method for estimating amounts of feed remaining in feedlot bunks includes: traversing a feedlot bunk from a first end to a second end with a mobile sensor arrangement comprising a ranging sensor unit and a positioning sensor unit; generating a range signal with the ranging sensor unit, the range signal indicative of a surface profile of feed within the feedlot bunk; generating a position signal with the positioning sensor unit, the position signal indicative of a geospatial position of the mobile sensor arrangement; generating MMS data at least in part based on correlating the range signal with the position signal; processing the MMS data to generate an estimate or indication of an amount of feed in the feedlot bunk.

Processing the MMS data may include identifying first and second end points of the feedlot bunk based at least in part on a comparison between the position signal and at least one known geospatial position of at least part of the feedlot bunk. Processing the MMS data may include identifying first and second end points of the feedlot bunk based at least in part on a comparison between the range signal and the known cross-section of the feedlot bunk.

Generating MMS data may further include correlating the range and position signals with an inertia correction signal indicative of the pitch, yaw and/or roll of the mobile sensor arrangement.

Generating MMS data may further include correlating the position signal with a real time kinematic (RTK) or satellite based augmentation (SBAS) correction signal.

In some embodiments a feedlot bunk calling system includes: a mobile sensor arrangement comprising a ranging sensor unit, for generating a range signal indicative of a distance between the ranging sensor unit and a surface of feed within a feedlot bunk, and an inertial measurement unit for generating an inertia correction signal indicative of the pitch, yaw and/or roll of the mobile sensor arrangement; and a computing module configured to generate an estimate or indication of an amount of feed in the feedlot bunk, based at least in part on the range signal and the inertia correction signal.

In some embodiments a feedlot bunk calling method for estimating amounts of feed remaining in feedlot bunks includes: traversing a feedlot bunk from a first end to a second end with a mobile sensor arrangement comprising a ranging sensor unit and an inertial measurement unit; generating a range signal with the ranging sensor unit, the range signal indicative of a surface profile of feed within the feedlot bunk; generating an inertia correction signal with the inertial measurement unit, the inertia correction signal indicative of orientation of the ranging sensor unit; generating mapping data at least in part based on correlating the range signal with the inertia correction signal; processing the mapping data to generate an estimate or indication of an amount of feed in the feedlot bunk.

As used herein, except where the context requires otherwise, the term "comprise" and variations of the term, such as "comprising", "comprises" and "comprised", are not intended to exclude further additives, components, integers or steps.

Further embodiments of the present invention will become apparent from the following description, given by way of example and with reference to the accompanying drawings.

DETAILED DESCRIPTION OF THE EMBODIMENTS

Figure 1:
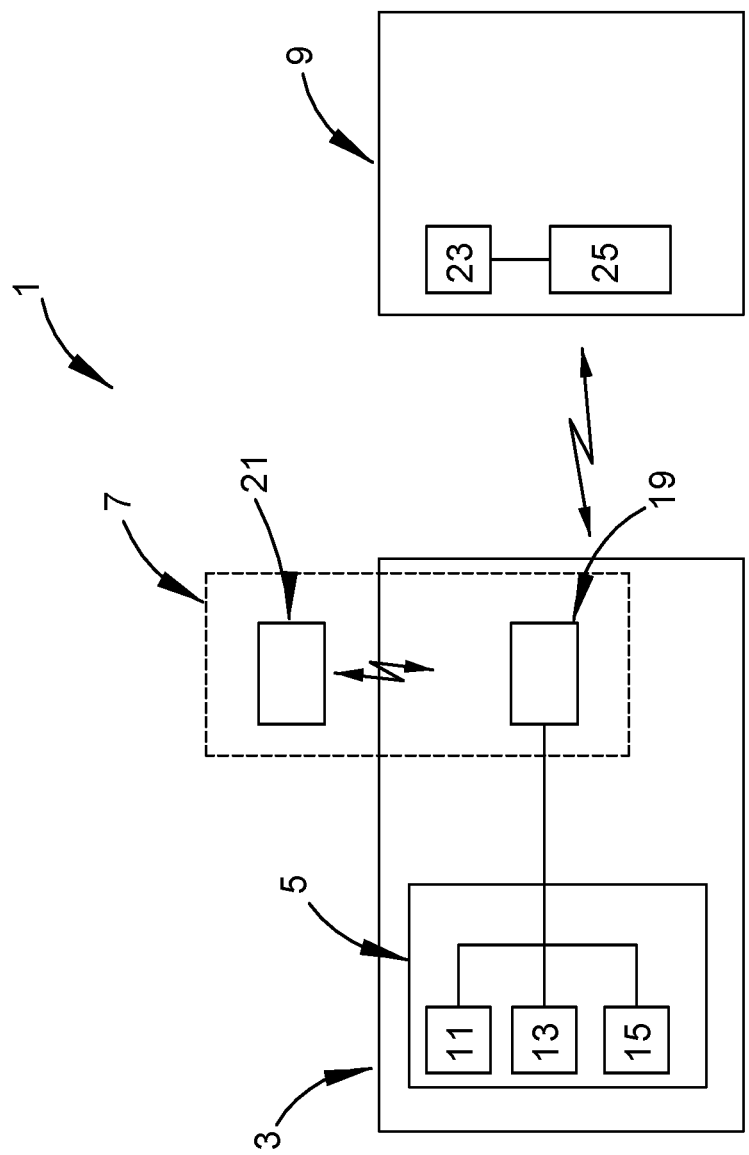
FIG. 1 is a block system diagram of one embodiment of a feedlot bunk calling system in accordance with the present disclosure.
Figure 2A:
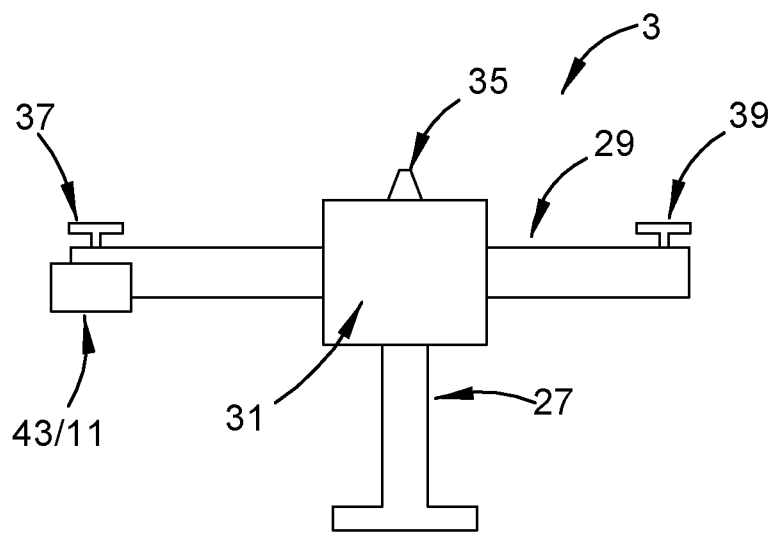
FIG. 2A is a plan view schematic representation of a feedlot bunk calling rover in accordance with the present disclosure.
Figure 2B:
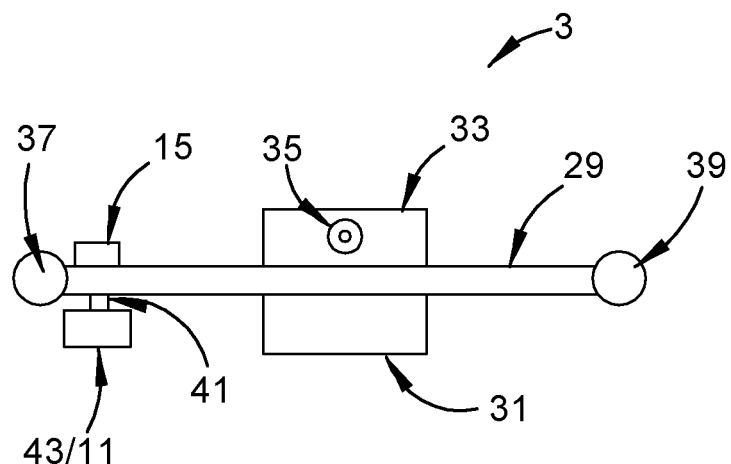
FIG. 2B is an elevational view schematic representation of a feedlot bunk calling rover in accordance with the present disclosure.

An example feedlot bunk calling system 1 for estimating amounts of feed remaining in a feedlot bunk is depicted as a block system diagram in FIG. 1. The system 1 in this embodiment comprises a feedlot bunk calling rover 3, a mobile sensor arrangement 5 provided on the rover 3, a computing module 7, and a base station 9.

The mobile sensor arrangement 5 comprises several sensor units generating measurement signals. In the depicted embodiment, the mobile sensor arrangement 5 comprises a ranging sensor unit 11, a positioning sensor unit 13, and an inertial measurement unit (IMU) 15. In other embodiments any subset of one or more of the depicted sensors may be used and further sensor units of the same or different type to those depicted may be used.

Figure 4:
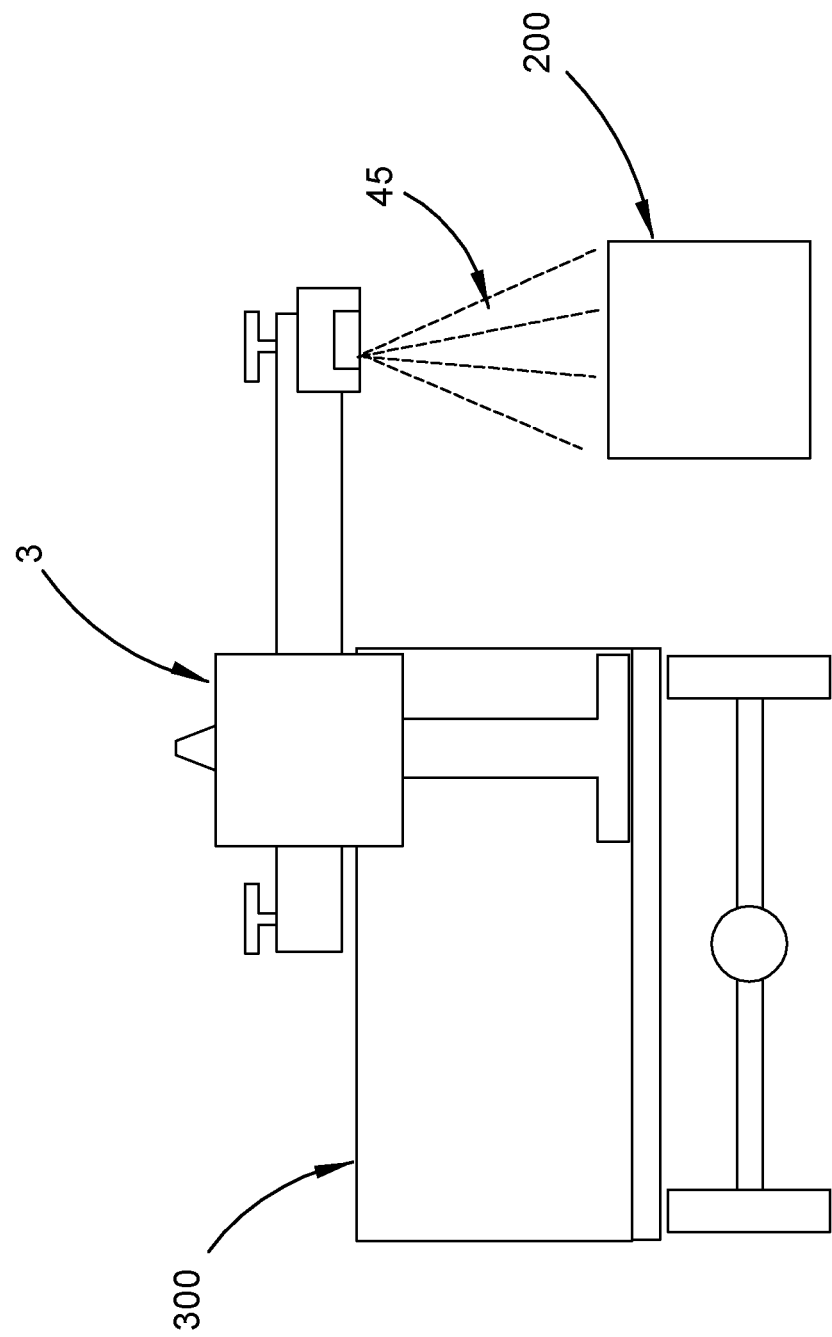
FIG. 4 is an elevational view schematic representation of a feedlot bunk calling rover calling at a feedlot bunk.

The ranging sensor unit 11 is configured to generate a range signal indicative of a distance between a sensor of the ranging sensor unit 11 and a surface of feed remaining within a feedlot bunk (as shown in FIG. 4). As will be discussed in more detail below, in one embodiment the ranging sensor unit 11 comprises a near-field laser (LiDAR) scanner. It will be appreciated that, in other embodiments, the ranging sensor unit may comprise alternative ranging means, such as radar or acoustic ranging means.

The positioning sensor unit 13 is configured to generate a position signal indicative of a geospatial position of the rover 3. As will be discussed in more detail below, in one embodiment the positioning sensor unit 13 comprises a GNSS receiver.

The IMU 15 is configured to generate an inertia correction signal indicative of the pitch, yaw and/or roll of the rover 3 and/or the mobile sensor arrangement 5.

As will be described in more detail within the following, the computing module 7 is configured to generate an estimate or indication of an amount, for example a volume, of feed remaining in a feedlot bunk, based at least in part on the range signal and the position signal. The estimate may further be based on knowledge of the cross-section of the feedlot bunk.

In one embodiment, the computing module 7 comprises a processor 19 for receiving and processing the localisation and mapping data generated by the various sensor units of the mobile sensor arrangement 5. In one embodiment the localisation and mapping data is generated simultaneously. In one embodiment, the processor 19 is an onboard processor, i.e. it is provided on the rover 3, and it is in wired communication with the mobile sensor arrangement 5. It will be appreciated that other embodiments are envisaged that may utilise alternative configurations. For example, the processor 19 may be in wireless communication with the mobile sensor arrangement 5 and/or the processor 19 may be provided remote from the rover 3.

The computing module 7 further comprises a User Interface (UI) 21 allowing a user to interact with the processor

19. In one embodiment, the UI 21 is a remote, web-based UI in wireless communication with the processor 19 and accessible via a cloud-based server.

The base station 9 is a georeferenced GNSS base station comprising a base antenna 23 and a base processor 25 for generating a RTK correction signal. The base antenna 23 is adapted to receive a real time GNSS signal indicative of the instantaneous geospatial position of the base station 9, as provided by real time visible satellites. The base processor 25 is adapted to compare the instantaneous geospatial position of the base station 9 with its known georeferenced position and generate the RTK correction signal. In other embodiments the base station 9 is omitted, or the functionality of the base station to provide RTK correction signals is omitted and the system operates without RTK correction signals.

As discussed above, the computing module 7 is configured to generate an estimate or indication of an amount, for example a volume, of feed remaining in a feedlot bunk based at least in part on the range signal and the position signal. In some embodiments, the computing module 7 may be configured to generate a mass of feed remaining in the feedlot bunk, for example based at least in part on the estimated volume of the remaining feed and a known density of the feed.

The estimate or indication of the amount of feed remaining may comprise an estimate or indication of the absolute amount of feed. For example, the estimate may be in the form of a volume estimate or a mass estimate. Alternatively, or in addition, the estimate or indication of the amount of feed remaining may comprise a relative measure, for example a difference in volume or mass or average height or similar measure between calls to the bunk.

The rover 3 is adapted to locate the mobile sensor arrangement 5 relative to a feedlot bunk, such that the ranging sensor unit 11 can scan the feedlot bunk. For example rover 3, in cooperation with a suitable vehicle, may maintain the ranging sensor unit 11 in a position above a feedlot bunk, at an orientation so as to scan generally downwards. The vehicle may move the rover 3 along the feedlot bunk so that the ranging sensor unit 11 scans the feedlot bunk in the transverse direction.

The range signal generated by the ranging sensor unit 11 and the position signal generated by the positioning sensor unit 13 are correlated by the processor 19, for example by matching respective time stamps associated with the data, to produce mobile mapping system (MMS) data. In some embodiments, this MMS data takes the form of a plurality of georeferenced, elevational cross-sections, each cross-section derived from a range signal scan and georeferenced by the time stamped correlated position signal. In other embodiments, the MMS data takes the form of 3D spatial data in which the data are georeferenced by the time stamp correlated position signal.

The computing module 7 processes the MMS data. In one embodiment, this processing involves calculating the cross-sectional area of remaining feed at each georeferenced, elevational cross-section having regard to a known feedlot bunk cross-section. The processing may include interpolating between each cross-section, for the length of the feedlot bunk. It will be appreciated that the length of the feedlot bunk used to calculate the volume of remaining feed may be determined by the computing module in various ways. In other embodiments, the calculation is based on 3D measurement data rather than using a progressive cross-section approach.

In one embodiment, the end points or other location information of the feedlot bunk are georeferenced, and their geospatial positions stored in the computing module 7. The computing module 7 can thus identify the relevant MMS data produced between the end points of the feedlot bunk by comparing the position signal with the stored geospatial positions of said end points. It will be appreciated that, in such an embodiment, operation of the ranging sensor unit 11 may be based on the position signal. For example, the computing module 7 may be provided with a control unit (not shown) that automatically activates the ranging sensor unit 11 when it is recognised that the ranging sensor unit 11 is located at or between the end points, or at least in their vicinity.

In an alternative embodiment, the computing module 7 may compare the range signal in the MMS data with the known feedlot bunk cross-section. The computing module 7 may then identify the relevant MMS data produced between the first and second end points of the feedlot bunk based on a sufficient level of correlation between MMS data cross-sections and the known feedlot bunk cross-section, e.g. the feedlot bunk is recognised within the MMS data if a pre-determined number of adjacent MMS data cross sections corresponds to a profile of the feedlot bunk, for example due to having a profile with a width and height within a range corresponding to a feedlot bunk.

In some embodiments the end points or other bounds of the feedlot bunk are identified by a combination of georeferencing and by sensing. For example, the computing module 7 may only determine from sensing data that a feedlot bunk is present when the rover 3 is determined to be in a location known to correspond to a location of a feedlot bunk. The sensing data may be MMS data or a subset thereof, or other data, for example a return signal from an RFID tag located on or proximate the feedlot bunk.

It will be appreciated that in various embodiments the computing module 7 may be configured to present any of a myriad of different graphical representations on the UI 21 of various data signals before, during and after the feedlot bunk scan process. Such graphical representations may be based on real time data signals delivered from the mobile sensor arrangement 5, e.g. depicting the real time location of the rover 3 on a map of the feedlot based on the position signal from the positioning sensor unit 13. One or more graphical representations on the UI 21 may be also based on the processed MMS data and take the form of a plurality of georeferenced, elevational cross-sections, in which each cross-section is derived from a range signal scan and georeferenced by a time stamp correlated position signal, or a plurality of points in 3D spatial data in which data are georeferenced by a time stamp correlated position signal.

Figure 5:
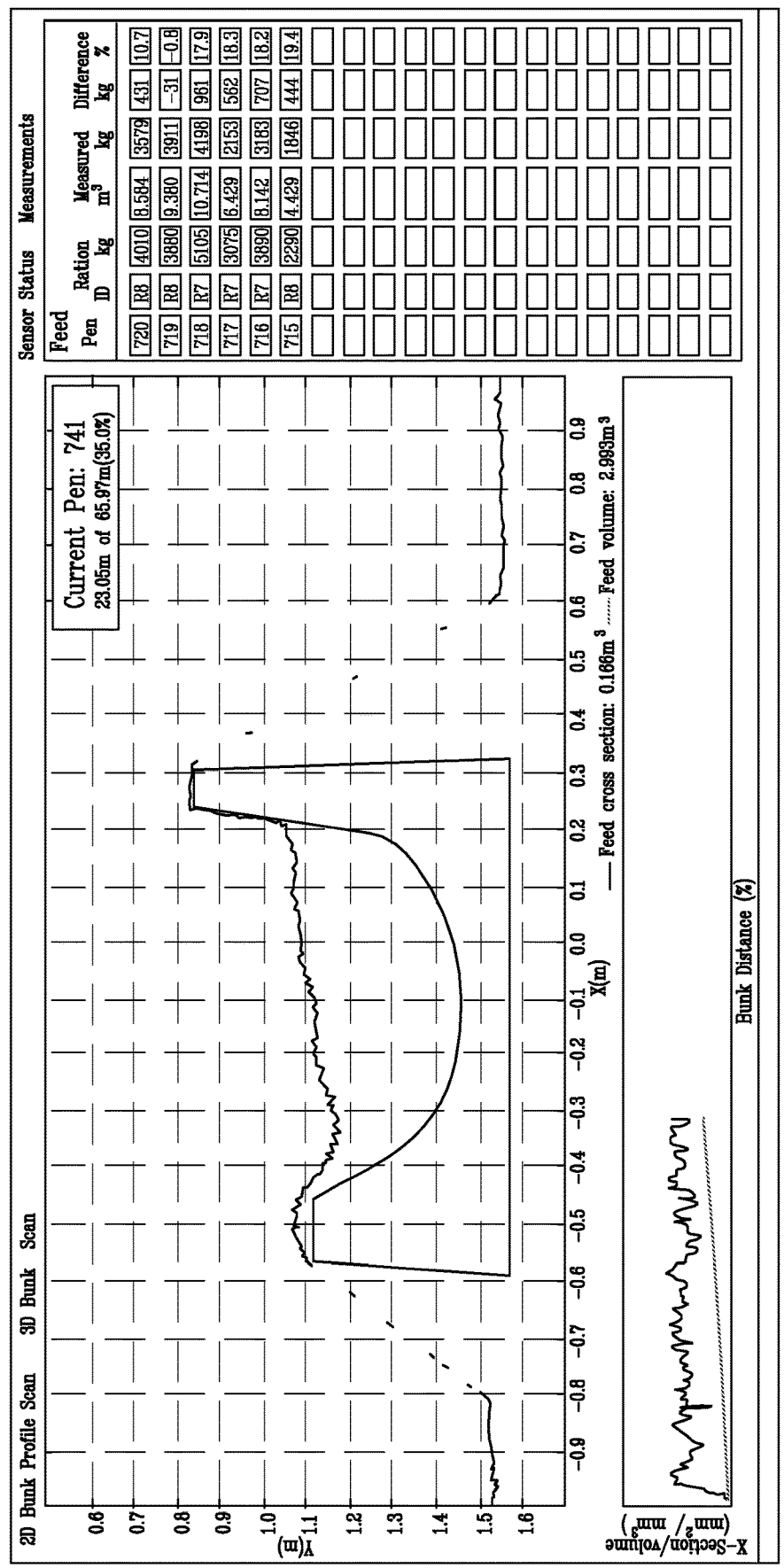
FIG. 5 depicts one embodiment of a user interface in accordance with the present disclosure.

FIG. 5 depicts one embodiment of a user interface displaying a 2D bunk profile scan (showing live ranging sensor unit measurement data), an indication of the identity of the feedlot bunk currently being scanned and the progress along it, and a strip plot showing instantaneous cross-sectional area of remnant feed, as well as cumulative volume, against bunk length.

Figure 6:
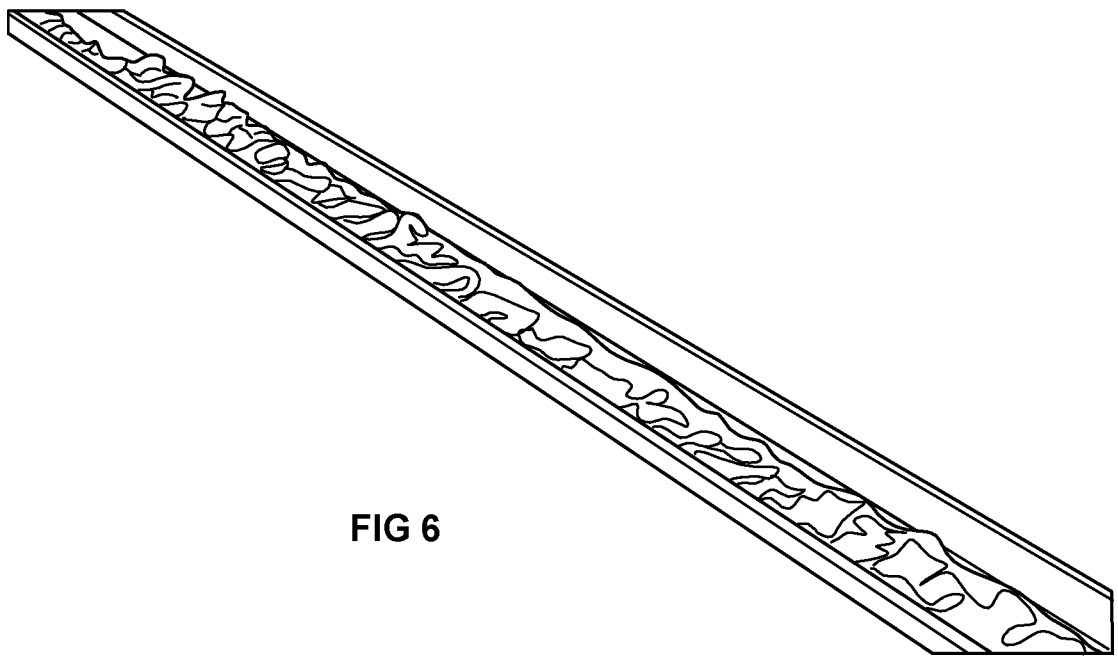
FIG. 6 is an example graphical representation for display on a user interface in accordance with the present disclosure.
Figure 7:
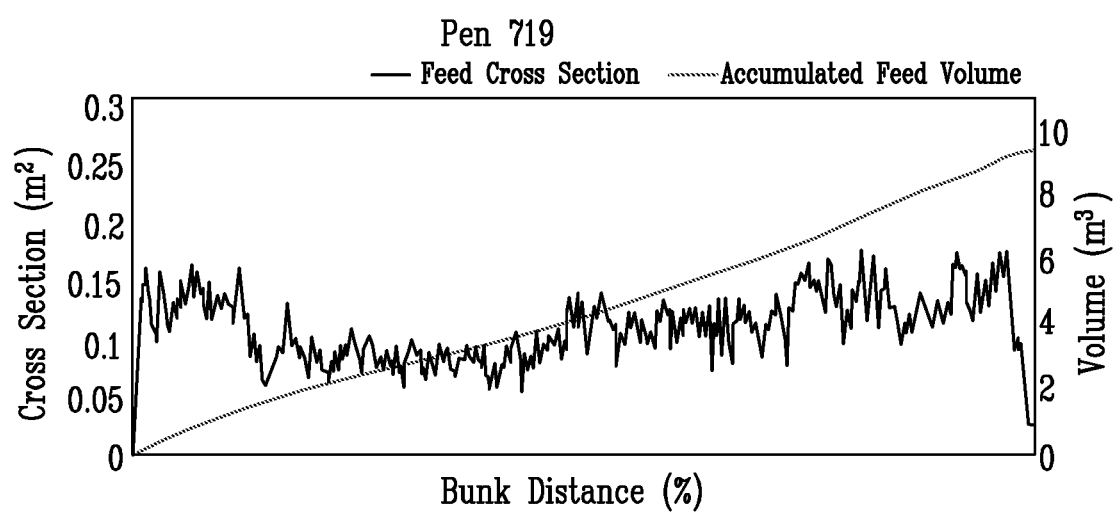
FIG. 7 is another example graphical representation for display on a user interface in accordance with the present disclosure.

FIG. 6 depicts an example of an alternative graphical representation for display on a user interface. The representation depicts a 3D bunk scan, showing spatial data in an interactive window, available at the completion of each pen's measurement. FIG. 7 depicts a further representation in which cross-sectional area of remaining feed is plotted against the distance along the bunk (as a percentage), with an overlaid cumulative volume value at the completion of measurement of the feedlot bunk.

It will be appreciated that, in some implementations, MMS data including correlated range and position signals alone will be adequate to provide a sufficiently accurate estimated volume or other indication of remaining feed.

It is understood that a position signal generated by the positioning sensor unit 13 comprising a GNSS receiver may include a positional error (or uncertainty) caused by factors such as satellite orbit variations, ionospheric effects, tropospheric delays and more local installation issues. In some embodiments, accuracy of the position signal may be improved by utilising a multi-constellation GNSS receiver that receives signals from at least two of the following Global Navigational Satellite Systems: GPS, GLONASS, BeiDou and Galileo. Further, or alternatively, accuracy of the position signal may be improved by utilising a multi-frequency GNSS receiver. In other embodiments, a RTK correction signal, for example generated by the base station 9 when provided, or a satellite-based augmentation system (SBAS) correction signal may be utilised to even further reduce such positional errors and increase the localisation accuracy of the MMS data. It will be appreciated that localisation accuracy may further improve the accuracy of the estimated volume of remaining feed.

In some embodiments, the position of the ranging sensor unit 11 on the rover 3 may be such that angular movement or rotation of the rover 3 around its various axes may create errors in the measurement of feed. In such embodiments, the inertia correction signal generated by the IMU 15 may be utilised to compensate for errors caused by such angular or rotational movement and thereby increase the mapping accuracy of the MMS data. In turn, this improvement in mapping accuracy may further improve the accuracy of the estimated volume of remaining feed.

Whilst one physical implementation of the rover system architecture discussed above will now be described with reference to FIGS. 2A to 4, it will be appreciated that the rover 3 may be physically manifested in various ways. In some embodiments, the rover may form an integral part of a purpose-built vehicle. In other embodiments, the rover may be mounted as a single unit, or in its individual components, on a vehicle. It will be understood that such vehicles may be manned or autonomous, and may be aerial or ground based vehicles.

Figure 3A:
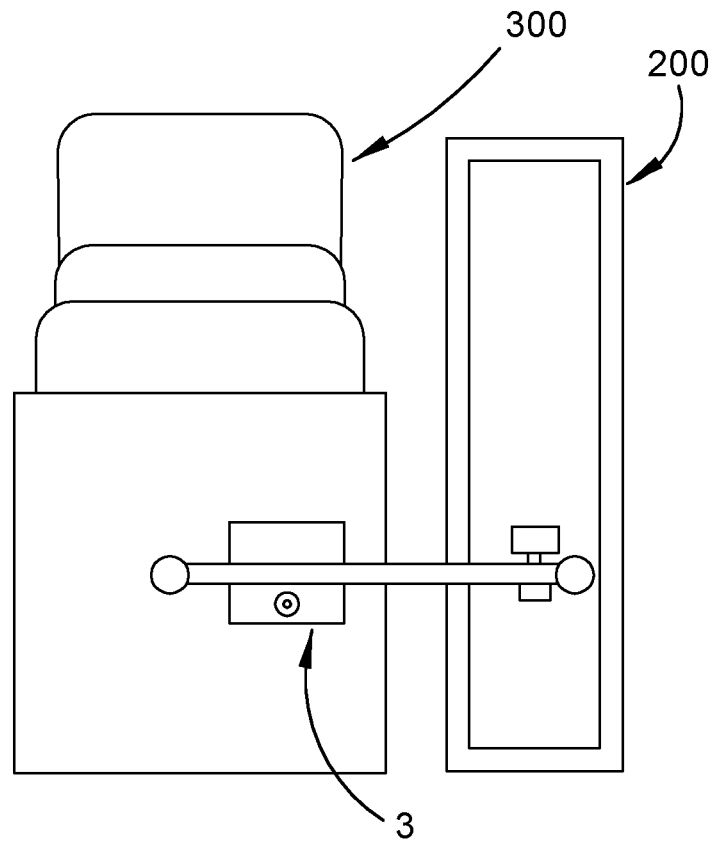
FIG. 3A is a plan view schematic representations of a feedlot bunk calling rover mounted to a ground vehicle in a calling configuration.

The rover 3 in this embodiment generally comprises a substantially vertical pedestal 27 and a substantially horizontal boom 29 mounted to the top of the pedestal 27. The base of the pedestal 27 is adapted to be mounted to a ground based vehicle 300, as shown in FIGS. 3A to 4. The boom 29 is a cantilevered boom 29 configured such that, in use, it extends in a transverse direction substantially perpendicular to a direction of travel of the rover 3.

The rover 3 further comprises a front enclosure 31 and a rear enclosure 33 mounted at the top of the pedestal 27 on opposite sides of the boom 29. The front and rear enclosures 31, 33 are environmentally hardened, thermoplastic enclosures with an enclosure rating to provide their contents with appropriate protection against the environment, for example UV radiation, water, and/or dust. In this embodiment, the onboard processor 19 of the computing module 7 (not visible in FIGS. 2A to 4), is provided within rear enclosure 33. A wireless antenna 35 connected to the onboard processor 19 is provided at the top of the rear enclosure 33 to ensure the onboard processor 19 is able to communicate wirelessly with the UI 21 and the base station 9. The enclosures 31, 33 may also include circuit protection, power distribution and a master isolator switch (not shown) for the rover 3.

As described above, the positioning sensor unit 13 in one embodiment comprises a GNSS receiver, which may be configured to receive multi-frequency and/or multi-constellation GNSS signals The GNSS receiver comprises two antennae 37, 39 positioned on the rover 3 such that, in use, they are offset in a direction substantially transverse to a direction of travel of the rover 3. In this embodiment, this offset is achieved by providing each antenna 37, 39 at a respective lateral end of the boom 29. The embodiment may include a second antenna, positioning the two antennae 37, 39 with such an offset to increase the accuracy of the MMS data by compensating for yaw (or changes in heading) and roll of the rover 3 independent of the IMU 15.

Figure 3B:
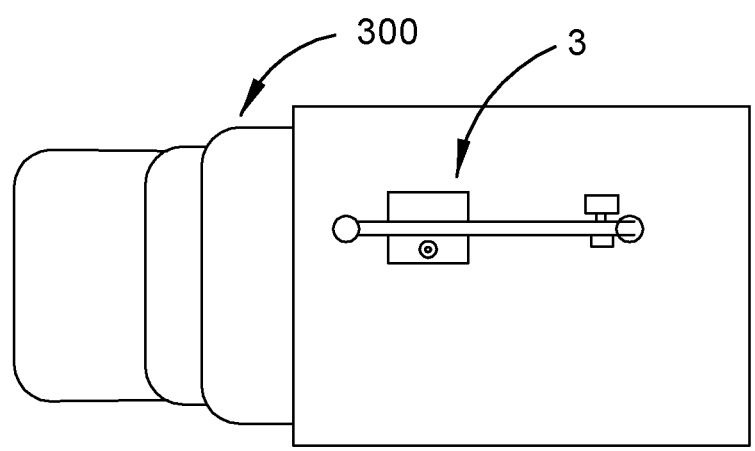
FIG. 3B is a plan view schematic representations of a feedlot bunk calling rover mounted to a ground vehicle in a stowed configuration.

As depicted in FIGS. 3A and 4, the ranging sensor unit 11 is mounted on the boom 29 at an end that, in use, is located outboard of the ground-based vehicle 300. The boom 29 is mounted to the top of the pedestal 27 via a vertical pivot and horizontal sliding connection (not shown). The vertical pivot connection allows the boom 29 to be rotated from the in use, outboard position depicted in FIGS. 3A and 4, to the stowed, inboard position in which the rover 3 does not extend beyond the nominal operating footprint (or volume) of the ground-based vehicle 300, as depicted in FIG. 3B. The horizontal sliding connection allows the length of lateral extension of the boom 29 from the pedestal 27 to be adjusted, which may be advantageous when it is desirable to compensate for differing installation locations and preferred vehicle clearances from the feedlot bunks, or when stowing the rover 3 within the nominal operating footprint/volume of the ground-based vehicle 300. A locking arrangement (not shown) may be provided to secure the boom 29 at its desired orientation and extension length.

The ranging sensor unit 11 in this embodiment comprises a near-field laser (LiDAR) scanner 43 mounted on the boom 29 via a gimbal connection 41. The LiDAR scanner 43 is oriented such that, in use, it is configured to emit pulses 45 towards the feedlot bunk 200 in a substantially vertical plane, and scan in a direction substantially transverse to a direction of travel of the rover 3, as shown in FIG. 4. The gimbal connection 41 allows rotational adjustments to be made to the ranging sensor unit 11.

As used herein, the phrase "wireless communication" is intended to include various wireless data transmission means/protocols, such as commercial 4G/LTE/5G mobile broadband connectivity, WiFi, Bluetooth, and UHF.

It will be understood that the invention disclosed and defined in this specification extends to all alternative combinations of two or more of the individual features mentioned or evident from the text or drawings. All these different combinations constitute various alternative aspects of the invention.

The invention claimed is:

1. A feedlot bunk calling system comprising:
   a mobile sensor arrangement comprising a ranging sensor unit, for generating a range signal indicative of a distance between the ranging sensor unit and a surface of feed within a feedlot bunk, and a positioning sensor unit, for generating a position signal indicative of a geospatial position of the mobile sensor arrangement; and
   a computing module configured to generate mobile mapping system (MMS) data based at least in part on correlating the range signal with the position signal, and process the MMS data to generate an estimate or indication of an amount of feed in the feedlot bunk.

2. The feedlot bunk calling system according to claim 1, wherein the computing module is configured to identify bounds of the feedlot bunk based at least in part on the position signal and a known geospatial position of at least part of the feedlot bunk.

3. The feedlot bunk calling system according to claim 1, wherein the computing module is configured to identify bounds of the feedlot bunk based at least in part on the range signal and a known cross-section of the feedlot bunk.

4. The feedlot bunk calling system according to claim 1, wherein the ranging sensor unit comprises a near-field laser (LiDAR) scanner.

5. The feedlot bunk calling system according to claim 1, wherein the positioning sensor unit comprises a GNSS receiver.

6. The feedlot bunk calling system according to claim 1, wherein the mobile sensor arrangement further comprises an inertial measurement unit for generating an inertia correction signal indicative of the pitch, yaw and/or roll of the mobile sensor arrangement, and the computing module is configured to generate the estimate or indication of the amount of feed in the feedlot bunk based at least in part on the range signal, the position signal and the inertia correction signal.

7. The feedlot bunk calling system according to claim 1, wherein the system further comprises a georeferenced base station for generating a real time kinematic (RTK) or satellite based augmentation system (SBAS) correction signal, and the computing module is configured to generate the estimate or indication of the amount of feed in the feedlot bunk based at least in part on the range signal, the position signal and the correction signal.

8. The feedlot bunk calling system according to claim 7, wherein the system further comprises a rover and the computing module comprises an onboard processor, wherein the mobile sensor arrangement and the onboard processor are provided on the rover.

9. The feedlot bunk calling system according to claim 8, wherein the onboard processor is in wired communication with the mobile sensor arrangement.

10. The feedlot bunk calling system according to claim 1, wherein the computing module further comprises a user interface and is configured to present a real time graphical representation on the user interface of at least one of the signals generated by the mobile sensor arrangement.

11. The feedlot bunk calling system according to claim 10, wherein the computing module is configured to present a real time graphical representation on the user interface of the MMS data in the form of a plurality of georeferenced, elevational cross-sections, each cross-section derived from a range signal scan and georeferenced by a time stamp correlated position signal.

12. The feedlot bunk calling system according to claim 10, wherein the computing module is configured to present a real time graphical representation on the user interface of the MMS data in the form of a plurality of a 3D spatial data.

13. The feedlot bunk calling system according to claim 1, wherein the mobile sensor arrangement is mounted on an unmanned aerial vehicle.

14. The feedlot bunk calling system according to claim 1, wherein the mobile sensor arrangement is mounted on an unmanned or manned ground vehicle.

15. The feedlot bunk calling system according to claim 1, wherein the ranging sensor unit is mounted on a substantially horizontal cantilevered boom that can be configured to extend in a transverse direction substantially perpendicular to a direction of travel of the mobile sensor arrangement.

16. The feedlot bunk calling system according to claim 15, wherein a length of lateral extension and/or an orientation angle of the boom can be adjusted.

17. The feedlot bunk calling system according to claim 15, wherein the ranging sensor unit is mounted on the boom via a gimbal connection, to allow manual rotational adjustments to the ranging sensor unit.

18. A feedlot bunk calling method for estimating amounts of feed remaining in feedlot bunks, the method comprising:
traversing a feedlot bunk from a first end to a second end with a mobile sensor arrangement comprising a ranging sensor unit and a positioning sensor unit;
generating a range signal with the ranging sensor unit, the range signal indicative of a surface profile of feed within the feedlot bunk;
generating a position signal with the positioning sensor unit, the position signal indicative of a geospatial position of the mobile sensor arrangement;
generating mobile mapping system (MMS) data at least in part based on correlating the range signal with the position signal; and
processing the MMS data to generate an estimate or indication of an amount of feed in the feedlot bunk.

19. The feedlot bunk calling method according to claim 18, wherein processing the MMS data includes identifying first and second end points of the feedlot bunk based at least in part on a comparison between the position signal and at least one known geospatial position of at least part of the feedlot bunk.

20. The feedlot bunk calling method according to claim 18, wherein processing the MMS data includes identifying first and second end points of the feedlot bunk based at least in part on a comparison between the range signal and the a known cross-section of the feedlot bunk.

21. The feedlot bunk calling method according to claim 18, wherein generating MMS data further includes correlating the range and position signals with an inertia correction signal indicative of the pitch, yaw and/or roll of the mobile sensor arrangement.

22. The feedlot bunk calling method according to claim 18, wherein generating MMS data further includes correlating the position signal with a real time kinematic (RTK) or satellite based augmentation (SBAS) correction signal.

23. A feedlot bunk calling system comprising:
a mobile sensor arrangement comprising a ranging sensor unit, for generating a range signal indicative of a distance between the ranging sensor unit and a surface of feed within a feedlot bunk, and an inertial measurement unit for generating an inertia correction signal indicative of the pitch, yaw and/or roll of the mobile sensor arrangement; and
a computing module configured to generate mapping data based at least in part on correlating the range signal with the inertia correction signal and process the mapping data to generate an estimate or indication of an amount of feed in the feedlot bunk.

24. A feedlot bunk calling method for estimating amounts of feed remaining in feedlot bunks, the method comprising:
traversing a feedlot bunk from a first end to a second end with a mobile sensor arrangement comprising a ranging sensor unit and an inertial measurement unit;
generating a range signal with the ranging sensor unit, the range signal indicative of a surface profile of feed within the feedlot bunk;
generating an inertia correction signal with the inertial measurement unit, the inertia correction signal indicative of orientation of the ranging sensor unit;

generating mapping data at least in part based on correlating the range signal with the inertia correction signal; and processing the mapping data to generate an estimate or indication of an amount of feed in the feedlot bunk.

* * * * *